March 31, 1970　　　　　L. LANG　　　　　3,503,714
APPARATUS FOR DECONTAMINATION OF EXHAUST GASES OF
INTERNAL COMBUSTION ENGINES
Filed Sept. 6, 1966　　　　　　　　　　　3 Sheets-Sheet 1
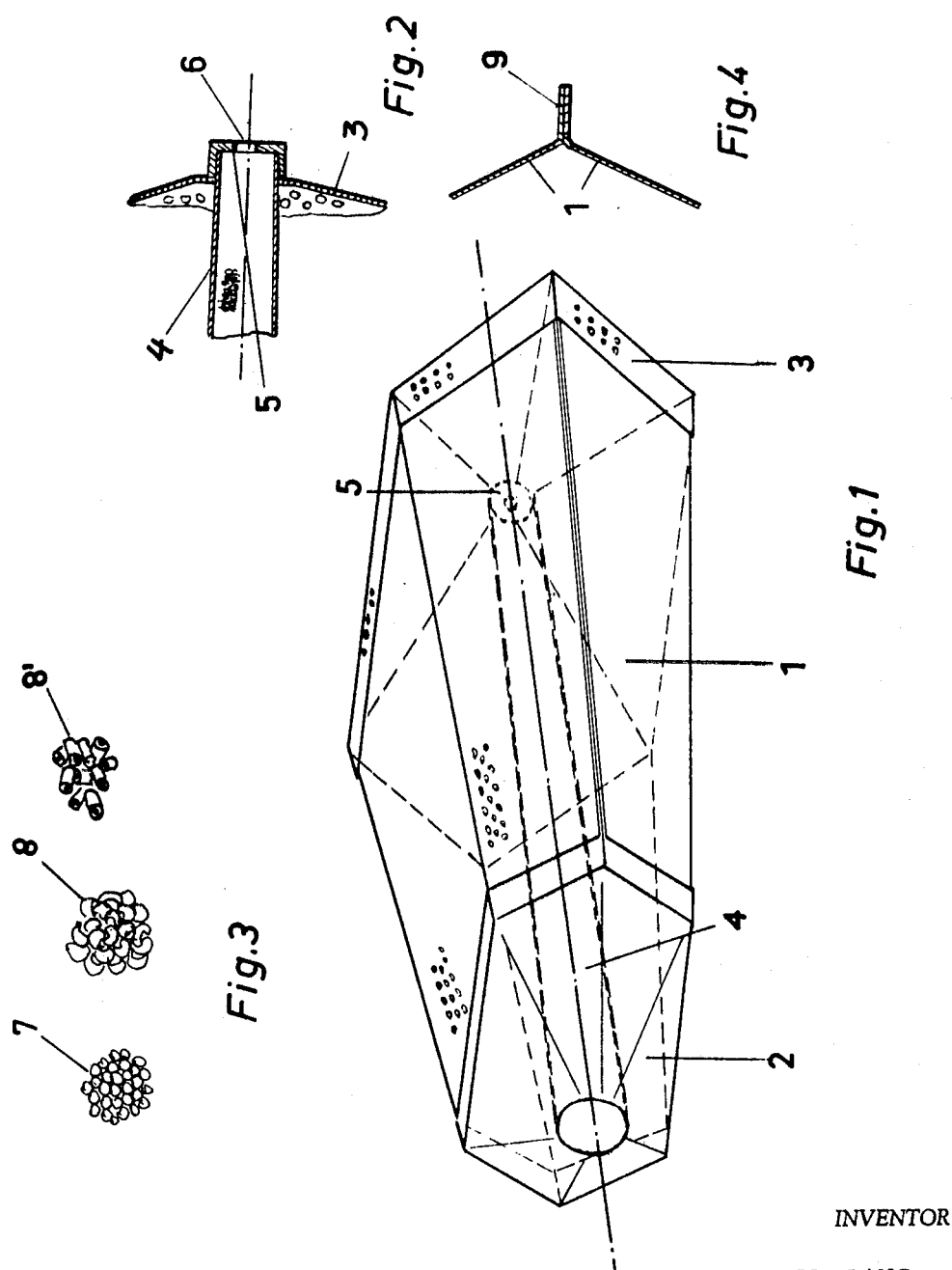
INVENTOR
LUDWIG LANG.
BY
ATTORNEY

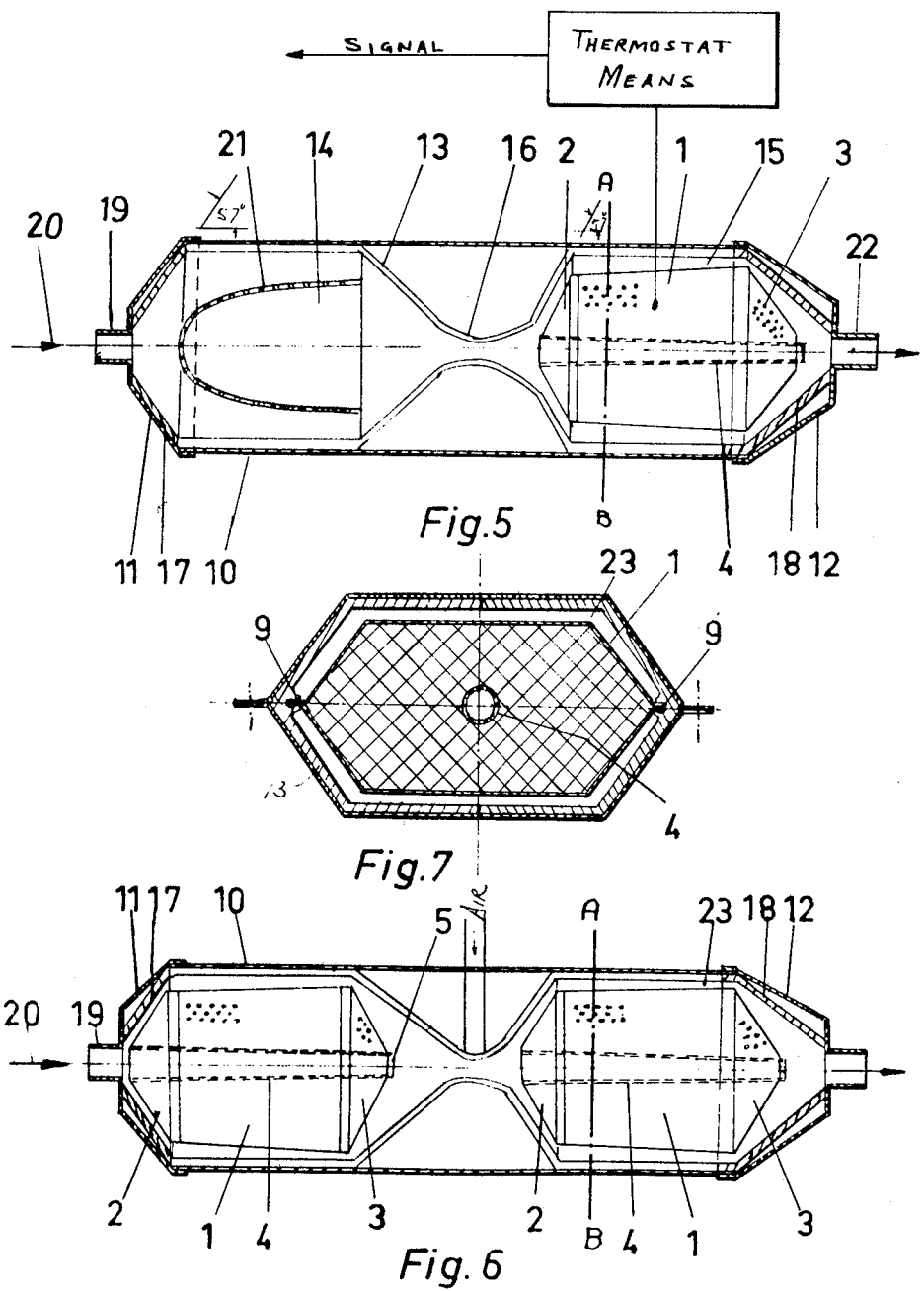

March 31, 1970  L. LANG  3,503,714
APPARATUS FOR DECONTAMINATION OF EXHAUST GASES OF
INTERNAL COMBUSTION ENGINES
Filed Sept. 6, 1966  3 Sheets-Sheet 3
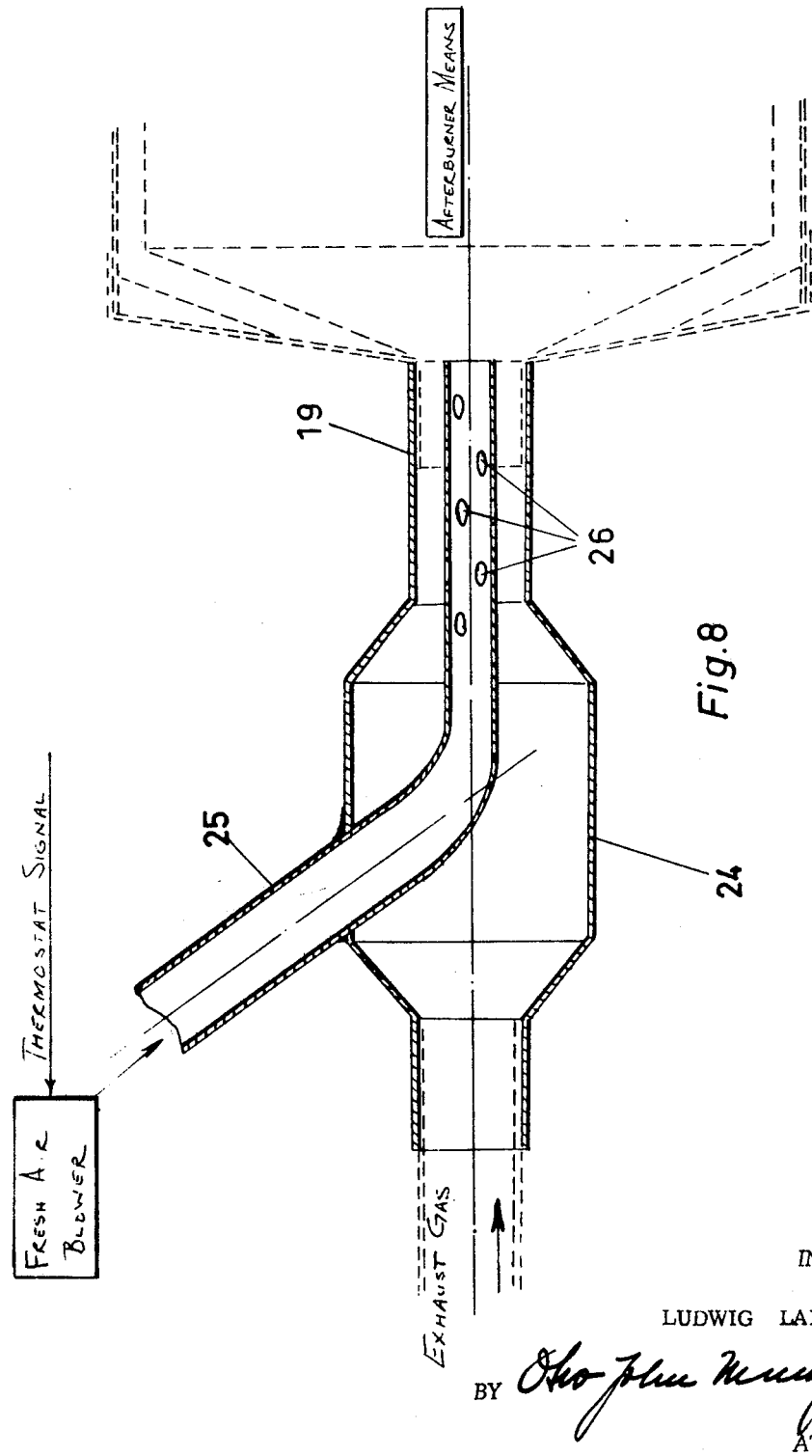
INVENTOR
LUDWIG LANG.
BY
ATTORNEY

United States Patent Office 3,503,714
Patented Mar. 31, 1970

3,503,714
APPARATUS FOR DECONTAMINATION OF EXHAUST GASES OF INTERNAL COMBUSTION ENGINES
Ludwig Lang, Darmstadt, Germany, assignor to Arno Fitterer & Sohn, Baden-Baden, Germany
Filed Sept. 6, 1966, Ser. No. 577,232
Claims priority, application Germany, Sept. 7, 1965, 1,301,337; June 16, 1966, 1,476,515
Int. Cl. B01j 9/04
U.S. Cl. 23—288         7 Claims

ABSTRACT OF THE DISCLOSURE

An exhaust gas decontamination device which utilizes two chambers separated by a venturi tube, in which the first chamber has an afterburner device or a catalyst body therein arranged, and in the second chamber a suitable catalyst mass is provided in a permeable housing having an internal flow channel, and in which a fresh air feed is provided forming an operating temperature regulator of an exhaust gas and air mixture in said device and in which a bypass system is provided operable to cause exhaust gas bypass for speed ranges in excess of 60 km./h. while inoperative for speed ranges below 60 km./h.

BACKGROUND OF THE INVENTION

The invention relates to a device for the decontamination of the exhaust gases of internal combustion engines by afterburning and/or catalytic oxidation of a gas mixture of exhaust gas and supplied fresh air, comprising at least two series-connected chambers positioned in the exhaust pipeline. These chambers may contain the afterburning device and the catalysts. There is furthermore a fresh air feed.

In the exhaust gas decontamination devices of known type, difficulties have been encountered when employing catalysts. These difficulties have resided predominantly in activating the catalyst at low temperatures, but also in maintaining the necessary operating temperatures, as well as in preventing an overheating in the catalyst zone.

SUMMARY OF THE INVENTION

The present invention has the objective of overcoming these difficulties and of constructing the decontaminating device in such a manner that the internal resistance of the device, which is to some extent calculated with respect to the sound attenuation, is not additionally increased by measures which must be taken in order to effect decontamination.

This problem is solved, according to the invention, by providing a device of the type mentioned in the foregoing, this device being characterized by the features that, in the first chamber, the afterburning device or a catalyst body is arranged, and, in the second chamber, connected with the first chamber via a venturi tube, a suitable catalyst mass is provided in a permeable housing having an internal flow channel. According to a special embodiment, the front wall of the first chamber has an aperture angle of about 50° to 60°, preferably 57°; in this chamber which terminates at the end in a venturi tube, an afterburning device is arranged, such as an open flame, a heating element, a thin, perforated, and contoured metal sheet, or the like. In the second chamber annexed to the venturi tube, a suitable catalyst mass is provided between two flow guide lids; between the inner wall of the chamber and the catalyst, a narrowing flow channel is arranged, and a narrowing flow channel, partially constricted at its end, extends in the center through the catalyst mass.

On account of this specially constructed two-chamber system along the lines of series-connected resonators, there result two thrust nozzle effects because of the thermal processes in the chambers. These thrust nozzle effects correspond approximately to the size of the internal increase in resistance caused by the incorporation of the decontamination devices.

The device of this invention is furthermore provided with a fresh air feed which can be arranged, for example, in the venturi tube between the two chambers. By this fresh air feed, an excess of fresh air is introduced, forming a regulating means for the operating temperature. With the advantageous flow of ths exhaust gas, the temperature of the mixture of exhaust gas and fresh air is adjusted so that there cannot arise a temperature excessively higher than the normal reaction temperature in the vicinity of the catalyst. The inner wall of the chamber can be enameled, resulting in advantages to the gas flow because of the favorable value of the surface friction. A blower can also be provided to feed fresh air. The speed of rotation of the blower can be controlled thermostatically from the catalyst zone.

A further feature of the invention is that CO, as well as unburned hydrocarbons, are substantially removed from the exhaust gas by catalytic oxidation. Furthermore, the influences of the antiknock agents are to be taken into account during the catalytic oxidation. In a further development, the invention includes, in this connection, a "bypass system." This systems provides that, in the lower speed range of up to about 60 km./h., the catalyst is fully activated, while the catalyst is maintained in an inoperative condition at higher speeds. For this purpose, it has already been proposed to employ a pressure-controlled valve which conducts the exhaust gas, in the lower speed range, through the catalyst, whereas the exhaust gas, in the upper speed range, is not passed through the catalyst. The reason for this is the discovery that when an engine is warm and the carburetor is correctly adjusted, it is not necessary in general, in case of smaller and medium engines, to undertake decontamination steps in the intermediate load range. Thus, the invention relates to a decontaminating device based on catalytic oxidation, which device has an effect similar to the "bypass effect" but does not include means, such as valves or the like. The device of this invention is constructed in such a manner that the required muffling is obtained simultaneously with the decontamination.

In order to solve the posed problem, a decontamination device is proposed by this invention which is characterized in that catalyst bodies are arranged in one or several chambers. These bodies have such a configuration, and are arranged such, that a more or less large partial stream of the exhaust gas and air mixture flows through the effective zone of the catalyst body, in inversely proportional dependence upon the exhaust gas velocity resulting from the speed of rotation of the engine. The remaining gas mixture flows around the catalyst body. Thus, the invention resides in providing the catalyst body in the chambers in such a manner, taking into account the thermo-aerodynamic conditions, that at low speed or standstill of the vehicle, the catalyst body is fully operative, while the exhaust gas and air mixture flows around the catalyst body at higher speeds. At these higher speeds, because of the higher temperatures, a decontamination of the exhaust gas is not necessarily required.

According to a special embodiment of the invention, the catalyst body consists of a porous metal housing, consisting preferably of perforated sheet metal having a likewise permeable rear lid but a closed front lid. A permeable internal flow-channel extends longitudinally through the metallic housing at the center thereof, this channel consisting preferably of metal mesh or expanded metal and being closed off at the rear by a closed terminal cap or a terminal cap having an opening. In the inner space between the internal flow channel and the housing, catalyst material is provided which has been shaped into an appropriate form or is arranged on an appropriate support. The partial stream which enters and is to be decontaminated is then forced, by the damming-up phenomenon, to flow through the inner space containing the catalyst material. In this connection, the flow velocity must be such that the required residence time is ensured so that the catalyst mass can exercise its effectiveness. The configuration of the supports for the catalyst is likewise determined by the required residence time. The catalyst mass has the purpose of adsorbing the exhaust gas and air mixture on its surface, effecting a chemical reaction and desorbing the reaction products. Any conventional and suitable catalyst mass can be employed in this connection.

The required residence time of the exhaust gas and air mixture in the catalyst body is determined by the stoichiometrical combustion time of the fuel. This combustion time stems from the combustion periods of a gas-air mixture in the cylinder of a motor and ranges approximately in the magnitude of 0.0075 to 0.010 second.

The exit openings in the boundary surfaces of the catalyst body, as well as the configuration of the supports for the catalyst mass are selected so that a certain residence time of the partial stream of the exhaust gas and air mixture to be decontaminated results. This time depends on the catalytic effectiveness of the catalyst mass and amounts minimally to about 0.015 to 0.02 second. Thereby, it is achieved that when the contact periods are exceeded, a further "bypass effect" is initiated, which contributes to a gentle treatment and a prolonged lifetime of the catalyst mass. The free area of the inner shell of the flow channel is to be as large as possible in this connection and is to have an aperture factor of 0.55 to 0.6. The size of the individual opening is determined by the size of the support body for the catalyst mass. The outer shell of the boundary surface of the catalyst body can be made, for example, of a perforated sheet metal, and an aperture factor of about 0.25 can be selected in this connection. Here, again, the diameter of the individual perforation is determined by the size of the support body.

The shape of the supports for the catalyst mass can be spherical, for example; however, it can also be in the form of Raschig rings, Berl saddle packing, or the like. The dimensions of the support bodies can be approximately on the order of between 3 and 5 mm., it being necessary, however, to install the support bodies fixedly and in a stationary manner in the catalyst body. When using support bodies of a specific configuration, there is the advantage that such bodies firmly engage one another even when they are loosely charged into the chamber and can stand shocks without incurring any appreciable mutual displacement. Basically, however, it is necessary to fixedly insert the support bodies so that the mechanical abrasion of the catalyst mass from the support bodies is kept as minor as possible.

Since the fuel generally contain lead compounds as antiknock agents, it is necessary to take measures for eliminating as much as possible the effects of lead-lining of the catalyst. It has been discovered, however, that the sulfur content present in the fuel is sufficient for converting the lead oxide, which is first formed, completely into lead sulfate. The thermal dissociation of the lead sulfate has an opposite effect, starting already at about 650° C. and increasing at a greater rate only above 800° C. In order to bring the unavoidable influence of the lead in the fuel upon the lifetime of the catalyst mass in the catalyst body to a bearable measure, it is suitable to maintain the operating temperatures of the catalyst mass at about 700–800° C. However, this can be attained only if the catalyst body has flowing around it the partial stream of the exhaust gas and air mixture fed thereto. When the flow cross sections for the amount of exhaust gas and air flowing through the catalyst body are appropriately adjusted to each other, a shutter-like opening can be provided at the end of the internal channel. The opening is determined on an evaluation of the threshold values of the admissible CO content and unburned hydrocarbons. Thereby, a small amount of exhaust gas exits and has an injector effect upon the exiting amount of exhaust gas and air.

The proportions of the exhaust gas and air mixture flowing through the catalyst body and that amount flowing around it are not constant. The proportion flowing around the catalyst body is in linear relation to the speed, the proportion flowing through the catalyst body being dependent upon the pressure head, i.e., it is variable with the square of the velocity. Similar conditions exist between the flow resistances, so that, with an increasing feeding velocity of the exhaust gas and air mixture, the proportion of the exhaust gas and air mixture flowing around the catalyst body is increased, whereby the "bypass effect" is obtained. However, there is not such a radical change as occurs when opening and closing a valve. This has a particularly advantageous effect during acceleration or deceleration, i.e., when opening up the engine and when throttling it down.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

BRIEF DESCRIPTION OF THE DRAWINGS

FIG. 1 shows, in principle and in a perspective view, a catalyst body which can be inserted in a device according to the invention.

FIG. 2 shows a detail of the catalyst body of FIGURE 1, in a sectional view.

FIGURE 3 shows three possibilities of configurations of the support bodies for the catalyst mass.

FIGURE 4 shows a further detail of the catalyst body according to FIGURE 1, in a sectional view.

FIGURES 5 and 6 show longitudinal sections through two different embodiments of the device of the present invention.

FIGURE 7 illustrates a cross section along line A–B of FIGURE 5 or FIGURE 6.

FIG. 8 shows a section through the specially constructed fresh air feed in a device according to the invention.

PREFERRED EMBODIMENT OF THE INVENTION

As can be seen from FIG. 1, the catalyst body comprises essentially a metallic housing 1, having, for example, a hexagonal cross section, and formed preferably of a perforated metal sheet. The housing 1 is closed off by a front lid 2 of smooth sheet metal. At the rear end, a further rear lid 3 is provided which, however, is made, just as the housing, of a perforated sheet metal. A permeable internal channel 4 extends through the center of the housing, this channel being preferably made of metal mesh or expanded metal. This channel extends through the front lid 2 and is open at the front end. The channel 4 extends through the rear lid 3 and is provided, as can be seen from FIG. 2, with a cover cap 5. This cap can be closed or can be provided with an opening 6, depending upon the desired conditions. Catalyst material is arranged in the inner space lying between the internal flow channel 4 and the walls of the housing 1, and between the two lids 2 and 3. The catalyst material is applied onto suitable support bodies. As can be seen from FIG. 3, these support bodies can be small spheres 7, so-called Berl saddles 8, or Raschig rings 8′. However, care must be taken that the support bodies are incorporated in the catalyst body as fixedly and immovably as possible. The size of the perforations of the housing 1 and the size of the perforations of the rear cover lid 3 depend on the size of the catalyst support bodies employed. As shown in FIGS. 4 and 7, the housing 1 has two halves which are combined in such a manner that a guide flange 9 is formed which serves for supporting the structure in a ceramic body 13.

In FIG. 5, an embodiment of the invention is shown in longitudinal section, as it can be employed, for example, in automotive vehicles of the small and medium piston displacement type of between 850 and 1,500 cc. In a central housing portion 10 closed off by a front cover 11 and a rear cover 12, two equally sized chambers 14 and 15 are formed by a suitably formed ceramic body 13; these chambers are connected with each other by a venturi tube 16. The ceramic body 13 is provided with a front ceramic lid 17 and a rear ceramic lid 18. The chamber 14 is in communication with an exhaust pipe, or a fresh air mixer, via an opening 19 extending through the front ceramic lid 17 and the cover 11. The exhaust gas flows into the chamber 14 in the direction of the arrow 20. In the chamber 14, a shaped metal sheet 21 is arranged consisting preferably of a scale-free perforated metal, which is to serve for sound attenuation and for thoroughly mixing exhaust gas and air. The front ceramic lid 17 and the outlet side of the connecting nozzle 16 between the two chambers 14 and 15 are preferably constructed in such a manner that, at the inlet of the exhaust gas and air mixture, an aperture angle of between 50° and 60°, preferably 57°, is provided. The downstream side of the chamber is made as slim as structurally possible, for the purpose of counteracting a damming-up effect when overcoming inherent flow resistances. Upon the occurrence of sufficiently high thermal gradients, and preferably at through-flow velocities at the narrowest cross section of about 20 m./sec., a clearly perceptible thrust effect occurs. This effect counteracts the increase in resistance on account of the incorporated catalyst and need only compensate for the proportion of resistance present above and beyond the acoustically planned resistance.

The ceramic body 13 can furthermore be inserted in the outer housing with the interposition of a heat-insulating and shock-absorbing molded part, preferably of asbestos, and it can consist of two symmetrical half shells having a longitudinally extending central parting line. By means of this construction, in conjunction with the ceramic lids 17 and 18 and the covers 11 and 12, access to the two chambers 14 and 15 can easily be obtained for exchanging the parts positioned therein, or to control such parts, or to clean the chambers. As can be seen from FIG. 7, the catalyst body, consisting of the housing 1, the two lids 2 and 3, the internal flow chanel 4 and the internally provided support for the ceramic mass, is provided in the chamber 15. The size of the catalyst body with respect to the size of the chamber 15 is selected so that a portion of the exhaust gas mixture can flow around the catalyst body, at appropriately high speeds. The chamber 15 is provided with an outlet opening 22. The rear exhaust pipe to the end of the automotive vehicle is connected at the opening 22. As shown in FIG. 7, the catalyst body can be mounted, by means of the lateral guide flange 9, in the ceramic body in such a manner that a free space 23 is created between the ceramic body and the catalyst body, surrounding the latter and serving to permit the exhaust gas to flow partially around the catalyst body. If, additionally, a heat-insulating and shock-absorbing intermediate layer is provided between the ceramic body and the outer housing 10, there is attained the advantage that this asbestos insert absorbs external shocks and establishes a good heat insulation in conjunction with the ceramic material. Also, a muffling effect is obtained with respect to sounds conducted through solids.

OPERATION

The device of the invention operates in the following manner:

The exhaust gas and fresh air mixture fed in the direction of the arrow 20 is intimately mixed in the first chamber 14. For this purpose, the contoured metal sheet 21 is advantageous. This mixing operation is of particularly great importance in the case of relatively small amounts of exhaust gas for purposes of the subsequent catalytic oxidation step. From an acoustical viewpoint, the eddy formation produced thereby has a muffling effect, particularly in conjunction with the change in cross section in this zone. In the second chamber 15, the gaseous mixture flows to a greater or lesser extent through the catalyst body provided therein, depending upon the exhaust gas velocity. In particular, in case of low speeds and during standstill, the proportion of the exhaust gas flowing therethrough is largest, so that the largest possible oxidation takes place in this range. At higher speeds, because of the internal damming up in the channel 4, a more or less large portion of the exhaust gas will move over the catalyst body in the direction toward the exit 22, since in such a speed range an intense combustion is no longer so urgently required.

In FIG. 6, a sectional view of an embodiment of the invention is illustrated which is to be used particularly in vehicles of the larger piston displacement class of about between 1,500 and 2,500 cc. Since in such piston displacement vehicles, considerably larger quantities of exhaust gases are produced which must be decontaminated, it is necessary either to provide considerably larger catalyst bodies, or to install also in the first chamber 14 a catalyst body as shown in FIG. 1. For this reason, a further catalyst body according to FIG. 1 is provided in the chamber 14, but there is the difference that the cover cap 5 of the internal flow channel 4 is closed, since a jet exerting an injector effect for the exiting exhaust gas and air mixture is not necessary upon entering the venturi tube 16. Of course, depending upon the conditions desired, the cover lid 5 can also be provided with a more or less extensive opening 6.

In FIG. 8, a sectional view of an arrangement for mixing fresh air with exhaust gas is illustrated. This arrangement comprises a housing 24 whose cross section is thickened with respect to the exhaust tube 19; a fresh air feed pipe 25 is inserted in this housing. The fresh air feed pipe 25 can be connected, for example, to a fresh air pump and tapers after joining the exhaust gas tube 19. The tapering configuration can be selected so that the exit velocity of the fresh air is approximately equal to the velocity of the exhaust gas. At the end of the fresh air pipe 25, several openings 26 can be provided. The feeding arrangement for the fresh air can be connected preferably to a device as shown in FIGS. 5 and 6. The portion of the fresh air feed pipe extending into the exhaust pipe can furthermore be made of such a length that the air is preheated therein.

The fresh air feed pipe can, however, also be introduced directly into the first chamber containing, for example, an afterburning device. This afterburning device can consist, for example, of a metal sheet such as thin copper sheet provided with a recess, supported on webs so that it is heat-insulated. Furthermore, in the region of the second chamber, a thermostat can be arranged which is connected with a blower drive. Finally, the fresh air feed can be conducted in the zone of the narrowest point of the venturi tube.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

I claim:

1. A device for the decontamination of the exhaust gases of internal combustion engines, comprising: two series-connected chambers; an exhaust inlet pipe connected to a first of said chambers; a means to mix gases, said means to mix being mounted in said first chamber; the second chamber connected with the first chamber by a venturi tube; a catalyst body mounted in said second chamber; said catalyst body comprising a permeable internal channel means open at the front end and at least substantially closed at the rear end, said channel means aligned in the flow of gases entering the second chamber through the venturi tube and spaced from said tube, the internal channel means narrowing in the direction away from the venturi tube, a nonpermeable front lid sealed to the exterior of the venturi-tube-facing end of the internal channel means and spaced from the internal walls of the second chamber, a perforated housing sealed to said front lid away from said internal channel means and expanding closer to the internal wall of the second chamber in the direction away from said first chamber, and a perforated rear lid sealed between the housing and the internal channel means at their ends farthest from the venturi tube, said rear lid being spaced from the internal walls of said second chamber; said second chamber having an outlet at its end farthest from the venturi tube, said permeable internal channel means permitting passage of the main portion of the gas flow at low speeds, and at high speeds the damming effect of said internal channel means causing additional amounts of the gas to flow through the space between the walls of the second chamber and said perforated housing.

2. A device as claimed in claim 1, further comprising a cover cap mounted across the end of said internal channel means farthest from the venturi tube.

3. A device as claimed in claim 1, further comprising catalyst support bodies filled into the space between the internal channel means, the front lid, the housing and the rear lid, said support bodies having catalyst material on them.

4. A device as claimed in claim 1, said chambers including a ceramic lining body.

5. A device as claimed in claim 1, further comprising a fresh air feed pipe connected into said first chamber, said feed pipe having openings in the flow region of exhaust gases.

6. A device as claimed in claim 5, further comprising a blower means to feed fresh air through said feed pipe.

7. A device for the decontamination of the exhaust gases of internal combustion engines, comprising: two series-connected chambers; an exhaust inlet pipe connected to a first of said chambers; the second chamber connected with the first chamber by a venturi tube; a catalyst body mounted in said chambers; said catalyst body comprising a permeable internal channel means open at the front end and at least substantially closed at the rear end, said channel means aligned in the flow of gases entering said chambers, the internal channel means narrowing in the direction away from the exhaust inlet in said first chamber and narrowing in the direction away from the venturi tube in said second chamber, a nonpermeable front lid sealed to the exterior of both exhaust-inlet-facing and venturi-tube-facing ends of the internal channel means and spaced from the internal walls of said respective chambers, a perforated housing sealed to said front lid away from said internal channel means and expanding closer to the internal wall of said chambers in the direction away from said exhaust inlet for said first chamber, and away from the venturi tube for said second chamber, and a perforated rear lid sealed between the housing and the internal channel means at their ends farthest from said exhaust inlet and said venturi tube respectively, said rear lid being spaced from the internal walls of said chambers; said second chamber having an outlet at its end farthest from the venturi tube.

References Cited

UNITED STATES PATENTS

| | | |
|---|---|---|
| 2,004,865 | 6/1935 | Grison. |
| 2,288,943 | 7/1942 | Eastman. |
| 2,604,185 | 7/1952 | Johnstone et al. |
| 2,985,255 | 5/1961 | Clark. |
| 3,094,394 | 6/1963 | Innes et al. |
| 3,211,534 | 10/1965 | Ridgway. |
| 3,220,805 | 11/1965 | Fowler et al. |
| 3,239,317 | 3/1966 | Rhodes. |

FOREIGN PATENTS

| | | |
|---|---|---|
| 631,368 | 6/1936 | Germany. |
| 448,850 | 6/1936 | Great Britain. |

JOSEPH SCOVRONEK, Primary Examiner

U.S. Cl. X.R.

23—277